United States Patent [19]

Coe

[11] 4,065,855
[45] Jan. 3, 1978

[54] STRUCTURAL COMBINATION FLANGE GAUGE

[76] Inventor: Norman O. Coe, 1535 Marburg Way, No. D-11, San Jose, Calif. 95133

[21] Appl. No.: 472,110

[22] Filed: Nov. 27, 1974

[51] Int. Cl.$^2$ ............................................. B23Q 17/00
[52] U.S. Cl. ................................................. 33/174 R
[58] Field of Search ...................... 33/189, 174 R, 191, 33/192, 174 B, 174 G, 185 R

[56] References Cited

U.S. PATENT DOCUMENTS

| 1,046,187 | 12/1912 | Hernlund | 33/189 |
| 1,250,833 | 12/1917 | Flanegin | 248/435 X |
| 1,725,476 | 8/1929 | Poppock | 33/189 |
| 1,826,807 | 10/1931 | McDanel | 33/189 |
| 2,842,860 | 7/1958 | Gray | 33/191 |
| 3,731,390 | 5/1973 | Sloan et al. | 33/189 |

*Primary Examiner*—Richard E. Aegerter
*Attorney, Agent, or Firm*—Victor R. Beckman

[57] ABSTRACT

The structural combination flange gauge of my invention for laying out the flange of structural steel beams and girders with great ease, speed, and accuracy comprises a base member with tripod, or three point, supporting means for the support thereof upon the web of the structure steel beam to be laid out. An inverted generally U-shaped stem bar is adjustably secured to the base member, which stem bar includes inner and outer leg portions connected by an intermediate portion adapted to extend over the flange of the beam upon which the base member is supported. A gauge member for use in marking of the beam flange is adjustably secured to the outer leg portion of the stem bar, which gauge member is generally E-shaped and includes a straight edge section extending parallel with the outer leg portion of the stem bar and a plurality of parallel arm sections extending at right angles from one side of the straight edge section. The upper and lower ends of the straight edge section extend above and below the respective upper and lower-most parallel arm sections of the gauge member to facilitate cross marking on the beam flange. The gauge member arms are uniformly spaced and are of a uniform width. Also, colinear line sections are formed on the parallel arm sections parallel with the straight edge section for use in angular marking of the beam flange. Axially aligned through holes are formed in the parallel arm sections of the gauge member through which the outer leg portion of the stem bar extends, and releaseable locking means such as a thumb screw releaseably secure the gauge member to said outer leg portion. In addition, an adjustable stop means is releaseably secured to the stem bar and which is adapted for abutment with the gauge member for establishing the position of the gauge member along the stem bar. The adjustable connection between the stem bar and base member includes a first pin pivoting the stem bar to the base member for pivotal movement of the stem bar about a longitudinal axis parallel to a plane passing through the feet of the tripod supporting means for angular layout of the flange. A pointer and associated dial means carried by the stem bar and base member provide a visual indication of the angular setting of the gauge member. The adjustable connection between the stem bar and base member includes a second pivot pin for pivotal support of the stem bar about a transverse axis also parallel to the plane passing through the feet of the tripod supporting means for tilting the gauge member in a forward or rearward direction for use on beams with twisted flanges.

9 Claims, 4 Drawing Figures

STRUCTURAL COMBINATION FLANGE GAUGE

SUMMARY OF THE INVENTION

An object of this invention is the provision of a new and improved structural combination flange guage for laying out structural beam flanges which avoids the above-mentioned problems and shortcomings of prior art layout gauges.

An object of this invention is the provision of a layout gauge which makes it possible to perform all phases of the structural beam flange layout from the web of the beam, thereby eliminating variations and obstacles encountered with present day tools which work from the edge of the beam.

An object of this invention is the provision of a layout gauuge which enables the craftsman to readily locate the center of the beam's web thickness, from which all dimensions are based, and to establish and maintain the same upon the outside of the flange throughout the entire layout of the unit.

An object of this invention is the provision of a layout gauge which, unlike prior art gauges which require three separate operations to complete the work, requires only a one-stop operation, thereby permitting all phase of layout to be completed before proceeding to the next and the next, resulting in a savings of both time and effort for the craftsman with a greater degree of accuracy.

An object of this invention is the provision of a layout gauge which, in addition to the standard layout of holes or studs at a right angle to the beam center, also provides ready setting for angular dimensions up to 6 5/8 on 12 inches from a 90° position across the flange in constant relation to the center of the beam's web thickness without the usual variations caused by change in flange width, nicks or burrs.

An object of this invention is the provision of a structural beam flange layout tool which may be used for laying out any part or section of the flange that requires stripping close and parallel to the beam's web, and for marking the locations of detailed parts to be welded to the flange.

The above and other objects and advantages of the invention are achieved by means of a layout gauge which includes a three legged base member adapted for support upon the web of the structural steel beam. An inverted generally U-shaped stem bar is adjustably secured to the base member, which stem bar includes inner and outerleg portions connected by an intermediate portion adapted to extend over the flange of the beam. A generally E-shaped gauge member with axially aligned holes in the parallel arm sections through which the outer leg portion of the stem bar extends is adjustably secured therealong. The parallel arm sections of the gauge which are of uniform width and uniformly spaced, extend at right angles from one side of a straight edge section which, in turn, extends parallel with the outer leg portion of the stem bar. The upper and lower ends of the straight edge section extend above and below the respective upper and lowermost parallel arm sections to facilitate cross marking on the beam flange. Replaceable gauge members are provided for use in different layouts. The adjustable connection between the stem bar and base member includes means for pivotal movement of the stem bar about generally perpendicular axes parallel to a plane passing through the supporting parts of the three legged base member for use in angular layouts and with warped or twisted flanges. A pointer and associated dial means carried by the stem bar and base member provide a visual indication of the angular setting of the gauge member.

Parts sometimes are identified as piece-mark in accordance with structural steel shop practice and abbreviated thus MK.

DESCRIPTION OF THE INVENTION

Figure 1:
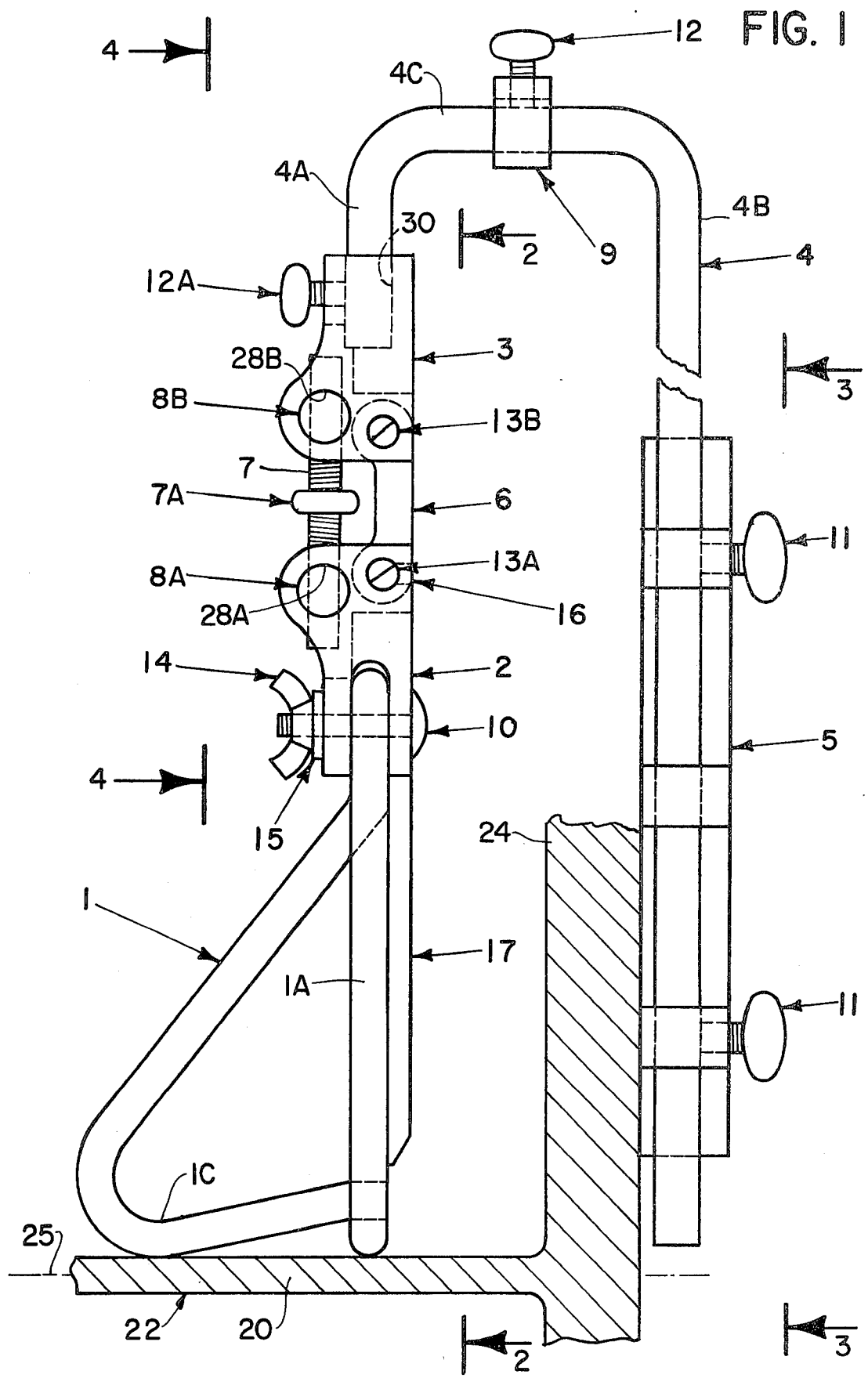
FIG. 1 is a front view showing the gauge assembly and a fragmentary portion of a structural beam to be laid out by use thereof.
Figure 2:
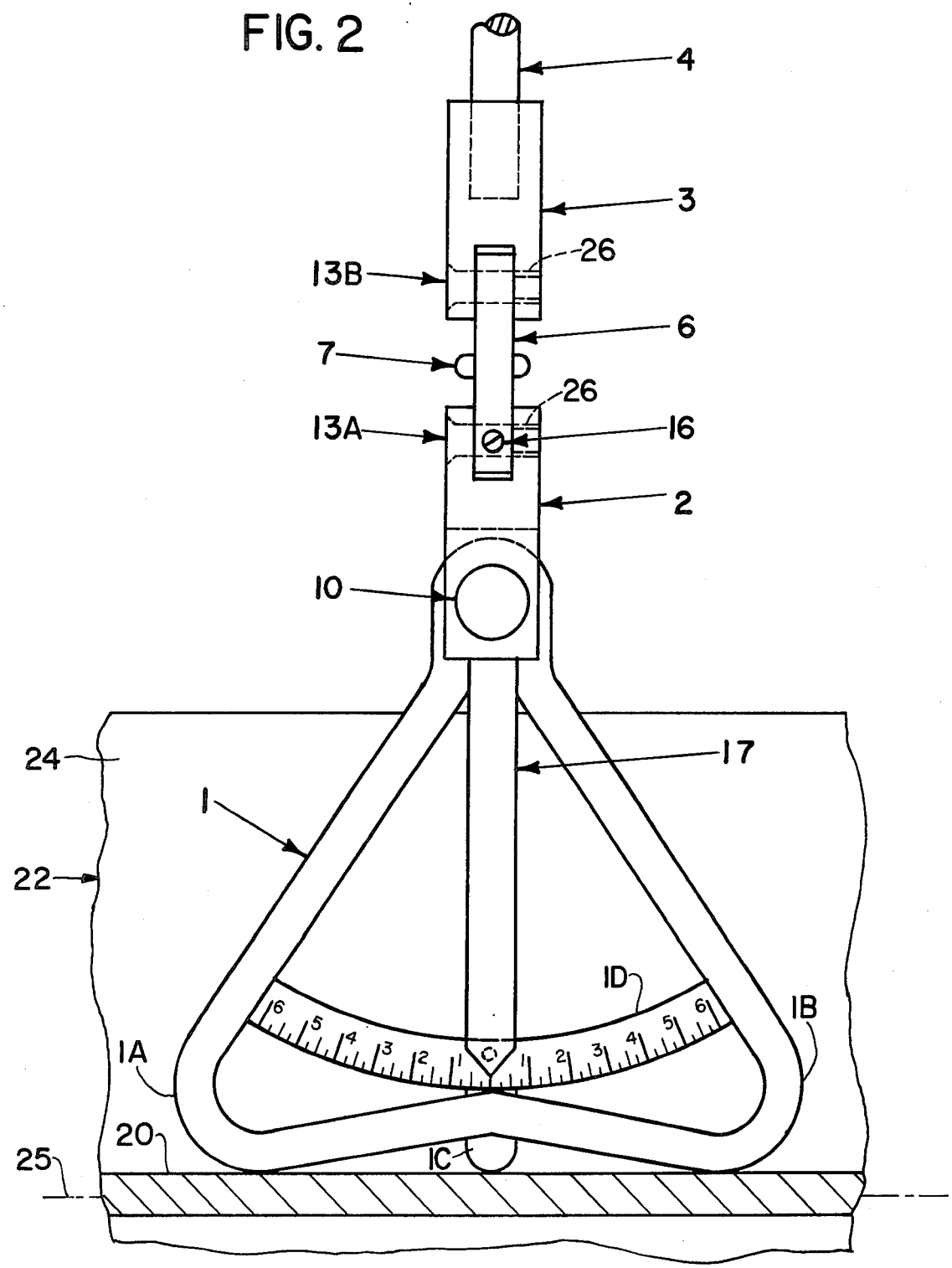
FIG. 2 is a view taken along line 2—2 of FIG. 1, showing the base member of the assembly, an indicator, releaseable and adjustable connecting means for securing the stem bar to the base member, and a fragmentary portion of the structural beam.
Figure 4:
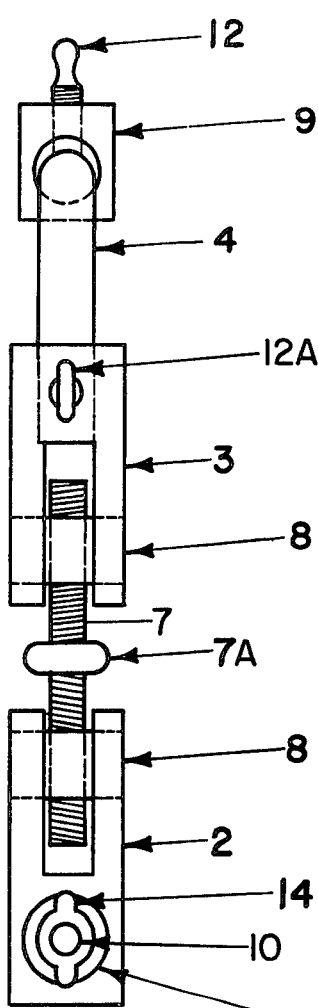
FIG. 4, taken along line 4—4 of FIG. 1, shows the connecting means 2 and 3, also adjuster and fixed gauge retainer.

Referring to FIGS. 1 and 2, MK 1 is the base of the gauge, fabricated from three round steel bars 1A, 1B and 1C of substantially identical design and shape, to form curved legs, the bottoms of which are adapted to rest upon the beam web for three-point support of the gauge. A circular dial 1D is centered in the lower end of the base member legs 1A and 1B. The dial is graduated in fractions and inches to be used in conjunction with an indicator 17 for angular setting. MK 1 is that portion of the gauge which rests directly upon the web 20 of the beam or girder 22 during the process of laying out the beam or girder flange 24. Line 25 shown in FIGS. 1, 2, and 3 identifies a plane extending along the center of the web 20 thickness.

MK 2 and MK3 identify lower and upper supporting members, respectively, included in the releasable and adjustable connecting means for connecting the stem bar 4 to the base member 1. The lower supporting member 2 has a bifurcated lower end to receive the upper end of the base member 1 of the gauge for releasable attachment thereto by means of a screw 10 and associated nut 14, which screw extends through aligned holes in the base and lower supporting members. When the nut 14 is loosened, the member 2, together with members supported thereby, is pivotable sideways in either direction from the illustrated vertical position about the screw 10 axis for setting the gauge for an angular gauge line of a desired magnitude as indicated by the position of the indicator, or pointer, 17 along the dial 1D. (See FIG. 2).

The upper supporting member 3 is attached to the lower member 2 through a link or hinge member 6 and pivot pins 13A and 13B in the form of flat head screws which threadedly engage tapped holes 26 in the supports 2 and 3, respectively, and extend through through holes in the hinge member 6. A set screw 16, when tightened, locks the lower end of the hinge member 6 to the lower support 2 through the lower pivot pin 13A whereby relative pivotal movement between the hinge member 6 and upper member 3 about the hinge pin 13B axis only, and not about the axis of the lower hinge pin 13A, is permitted. Additional pivotal movement is possible when the set screw 16 is released to allow for pivotal movement about the axes of both the lower and upper hinge pins 13A and 13B. Pivotal adjustment of the lower and upper supporting members 2 and 3 about the pins 13A and 13B is under control of an adjuster 7 comprising a rod having right and left hand threads at opposite ends which threadedly engage suitably threaded pivot pins 8A and 8B pivotally mounted in apertures 28A and 28B formed in the lower and upper members 2 and 3, respectively. The axes of the pins 13A and 13B extend transversely of the gauge whereas the axis of angle adjusting pin 10 extends longitudinally thereof. It will be seen that when the adjuster 7 is rotated by use of the handle portion 7A formed at the center thereof, the upper supporting means 3 is pivotally moved forward or backward about one or both of the hinge pin 13 axes to compensate for beam flange tilt or twist.

MK 4 identifies the generally inverted U-shaped stem bar comprising an inner leg section 4A removably attached to the upper supporting member 3, a long outer leg 4B adapted to be positioned adjacent the outer face of the flange 24 to be marked, and an intermediate leg portion 4C interconnecting the inner and outer sections 4A and 4B. The lower free end of the inner leg section 4A extends into an aperture formed in the top of the supporting member 3 and is removably secured thereat by means of a thumb screw 12 which, when tightened, fixes the stem bar to the support. Stem bars of different dimensions may be provided for use with structural beams having different flange dimensions.

MK 5 identifies a generally E-shaped dual fixed gauge (FIG. 3) comprising a generally vertical straight edge section 5A and a plurality of arm sections 5B, 5C, and 5D extending at right angles from one side thereof. Straight edge section 5A has a straight side 5E machined to a parallel position with section 4B of the stem bar. With the indicator 17 set at zero on the dial 1D and with the adjuster 7 in the center position illustrated in FIG. 1, the straight edge 5E extends perpendicular, or normal, to the plane defined by the bottom web engaging points of the three supporting legs 1A, 1B and 1C of the base member 1. With the base member resting on the web of the beam the plane defined by the bottom of legs 1A, 1B and 1C is parallel to the plane 25 extending along the center of the web thickness.

The gauge arm sections 5B and 5D are equidistantly spaced from the center arm 5C, and all three arms are of the same width whereby the distances between surfaces 5F and 5H, 5H and 5J, 5G and 5I, and 5I and 5K is the same. As will be understood, this allows the gauge member to be placed on the stem bar with either arm 5B or arm 5D uppermost for reasons which will become apparent heinbelow. Axially aligned through holes 5M, 5N and 5P are formed in the gauge arms through which the outer leg section 4B of the stem bar slideably extends. Thumb screws 11 releasably secure the gauge member to the stem bar at any desired height therealong. Indicia, such as colinear line sections, or shallow grooves, 5L are formed on the parallel arm sections parallel with the straight edge section 5A for use in angular marking of the beam flange. These grooves are necessary to maintain the center of the flange where gauge dimensions are placed at an angle.

Hinge member 6 made of flat steel plate or the like, works in conjunction with adjuster interconnect 7 to members 2 and 3, and also acts as a hinge to permit pivotal movement of member 3 when desired.

MK 7 is described as an adjuster which is responsible for the upper or lower motion (i.e. forward or rearward tilt adjustment) of stem bar 4 accomplished by a clock or counter clockwise of the adjuster.

MK 8A and 8B are pivot pins, each of which comprises a round bar of cold roll steel quality, having oppositely threaded holes at their very centers for threadedly receiving adjuster 7. The pivot pins are free to pivot as members 2 and 3 are pivoted about pins 13A and/or 13B by the turning motion of adjuster 7 in either direction.

Figure 3:
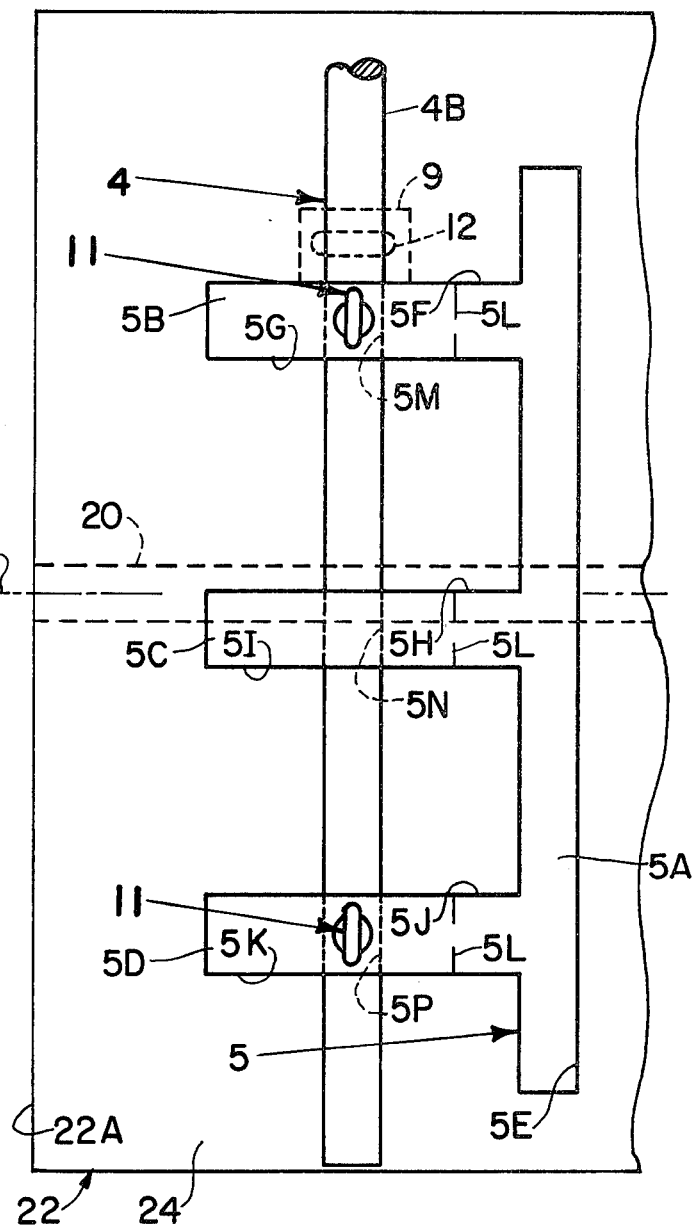
FIG. 3, taken along line 3—3 of FIG. 1, shows the fixed gauge, a portion of the stem-bar and a fragmentary portion of the structural beam, but also showing in broken lines a retainer and associated thumb screw moved to a lower position from that shown in FIG. 1 adjacent the fixed gauge.

MK 9 is a retainer. Its only function is to maintain an exact setting when fixed gauge 5 position has to be reversed at the extreme end of a beam or girder. In FIG. 3 the retainer 9 is shown in phantom lines locked in position against the surface 5F of the gauge arm 5B. To layout the flange 24 adjacent the beam end 22A, the retainer 9 is locked in the illustrated position, and the thumb screws 11 loosened to permit removal of the gauge from the stem bar. The gauge then is reversed, or inverted, and reattached to the stem bar with the arm 5D abutting the retainer. Now, with the straight edge section 5A located to the left of the stem bar section (as viewed in FIG. 3) markings adjacent the end 22A of the beam may be made. The above-described symmetrical construction of the gauge member allows for such reversal of position thereof on the stem bar without altering the spacing of the gauge arms from the center of the web thickness.

MK 10 is an oval head type screw which fastens lower support member 2 to base 1 and permits member 2 to rotate indicator 17 as attached to member 2 as required for a particular angle setting.

MK 11 are thumb screws. Their primary function is to secure the gauge member 5 to the stem bar 4 at the beam flange center or any arrived at height.

MK 12 and 12A are also thumb screws, one of which (12A) is threaded into upper support member 3 to secure the stem bar 4 in its socket; the other (12) is threaded into retainer 9 and is finger tightened when 9 is placed against fixed gauge 5 for the purpose of maintaining that height while 5 is being reversed.

MK 13A and 13B are flat head screws threaded into one side of members 2 and 3 upon which the hinge member 6 pivots as adjuster 7 is turned in the process of aligning the stem bar 4 and gauge member 5 with beam flange 24.

MK 14 is a threaded nut that tightens upon screw 10, thereby pulling together that bifurcated portion of support 2 which straddles base member 1 causing member 1 and support 2 to remain in a steadfast position. MK 14 is finger tightened or loosened with ease.

MK 15 is a flat steel washer located between nut 14 and support 2 against which nut 14 is tightened, separating nut 14 from support 2 as it is turned and so doing reduces possible wear on support 2.

MK 16 is a set-screw of fine thread design which, when tightened, locks the hinge member 6 to pivot pin 13A in a rigid position and so doing prevents any movement of the hinge member 6 on its lower pivot when desired.

MK 17 is an indicator premanently attached to lower support member 2 which indicator rotates over the dial on 1, giving the correct setting for an angular gauge-line along the straight side 5E of gauge member 5.

Following is a procedure for laying-out a beam or girder with the combination flange gauge.

A beam or girder is laid-out in the following manner: the base of the gauge MK 1 rests upon or against the web 20 of the beam while stem-bar MK 4 straddles the edge of the flange 24 permitting fixed-gauge MK 5 to rest against the outside of the flange where layout is required.

After the beam center 25 is established, which is done by placing the base 1 of the gauge against the web on one side of the beam and scribing a short line along the top surface of the center arm 5C on the fixed-gauge 5, it is then placed upon the other side of the web 20 and once again a short line is scribed along the same surface of the center arm 5C of fixed gauge. The center of the beam or girder web is the center distance between these two scribed lines.

Next the stem-bar MK 4 is tilted in or out by turning adjuster MK 7 thereby permitting fixed-gauge MK 5 to lay flatly against the outside of the beam flange. The two thumb screws MK 11 are loosened, and the fixed-gauge MK 5 is then moved to position the top surface (5H as viewed in FIG. 3) of the gauge center arm 5C along the line which has been established on the flange as the web center.

The straight or perpendicular side 5E of the fixed-gauge 5 is placed at a given dimension on the flange previously located with the use of a measuring tape, a line is scribed the length of the straight side, the gauge base 1 is then moved along the web placing the line just scribed somewhere between the tip of the fixed-gauge arms 5B, 5C and 5D and stem-bar Mk 4, a short line is scribed along the top surface of the two outer arms, therefore, completing the layout at this particular location.

Where dimensional gauges are placed at an angle to the web, the procedure is the same except as follows: the scribe lines 5L on the three arms located between stem-bar Mk 4 and the straight side of gauge must be used in order to maintain the exact center of the beam's web. Once a line has been scribed along the straight side, the gauge is moved forward aligning this line with those lines 5L on the gauge arms, and again at this point two short lines are marked or scribed along the top surface of the two outer arms.

For placement of studs upon the flange center, the process is the same except that the center arm 5C of the fixed gauge is used as it is always centered during the layout of holes or studs.

It will be seen, then, that the structural combination flange gauge simplifies the layout of beams or girders flange and permits greater speed and accuracy.

The tool is equipped with corresponding fixed gauge size for various dimensions, which is quickly attached to the tool.

Each gauge is identified as 1½ & 3, 1¾ & 3¼, 2 & 4, 2½ & 5 and so on, meaning that the gauge has two dimensions.

I claim:

1. A layout gauge for laying out a flange of structural steel beams and the like comprising,
    a tripod-type base member for three point support thereof upon the web of a structural beam,
    an inverted generally U-shaped stem bar having inner and outer leg portions connected by an intermediate portion adapted to extend over a flange of a structural beam upon which the base member is supported,
    means for securing the inner leg portion of the stem bar to the base member,
    a gauge member for use in marking off the beam flange, and
    means for securing the gauge member to the outer leg portion of the stem bar for use in marking off the beam flange.

2. A layout gauge for laying out a flange of structural steel beams and the like comprising,
    a tripod-type base member for support upon the web of a structural beam,
    an inverted generally U-shaped stem bar secured to said base member and having inner and outer leg portions connected by an intermediate portion adapted to extend over a flange of a structural beam upon which the base member is supported, and
    a gauge member secured to the outer leg portion of the stem bar and having a straight edge section extending parallel therewith and a plurality of parallel arm sections extending at right angles from one side of the straight edge section for use in marking off the beam flange.

3. The layout gauge as defined in claim 2 wherein said gauge member is generally E-shaped with the straight edge section thereof extending above and below the respective upper and lower-most parallel arm sections thereof to facilitate cross marking on the beam flange.

4. The layout gauge as defined in claim 2 wherein said gauge member is generally E-shaped with uniform and evenly spaced parallel arm sections.

5. The layout gauge as defined in claim 2 including colinear line section formed on the parallel arm sections parallel with said straight edge section for use in angular marking of the structural beam flange.

6. The layout gauge as defined in claim 2 including releasable securing means for releasably securing said gauge member to the outer leg portion of the stem bar, said releasable securing means including axially aligned through holes in said parallel arm sections of said gauge member through which said outer leg portion of said stem bar extends, and
    means for locking said gauge member to said outer leg portion at any desired position within a range of positions therealong.

7. The layout gauge as defined in claim 6 including adjustable stop means releasably secured to said stem bar and adapted for abutment with said gauge member for establishing the position of said gauge member along said outer leg portion of the stem bar.

8. A layout gauge for laying out a flange of structural steel beams and the like comprising,
    a base member for support upon the web of a structural beam,
    an inverted generally U-shaped stem bar having inner and outer leg portions connected by an intermediate portion adapted to extend over a flange of a structural beam upon which the base member is supported,
    a gauge member secured to the outer leg portion of said stem bar for use in marking off the beam flange,
    securing means for releasably securing said stem bar to said base member within a range of sideward angular positions with respect to said base member for use in angular layout of said beam flange, and pointer and associated dial means attached to said stem bar and base member for indicating the angular setting of said gauge member.

9. A layout gauge for laying out a flange of structural steel beams and the like comprising, a base member for support upon the web of a structural beam, an inverted generally U-shaped stem bar having inner and outer leg portions connected by an intermediate portion adapted to extend over a flange of a structural beam upon which the base member is supported, a gauge member secured to the outer leg portion of said stem bar for use in marking off the beam flange, and adjustable connecting means for adjustably securing said stem bar to said base member for tilting said gauge member in a forward or rearward direction to accommodate twisted beam flanges.

* * * * *